Patented Oct. 14, 1952

2,614,081

UNITED STATES PATENT OFFICE 2,614,081

PICKLING BATH FOAMING AGENT

James W. Carroll, Philadelphia, Pa., assignor to The Pennsylvania Salt Manufacturing Company, Philadelphia, Pa., a corporation of Pennsylvania No Drawing. Application March 26, 1948, Serial No. 17,370

9 Claims. (Cl. 252—151)

This invention relates to an improved foaming agent for metal pickling baths.

Metal pickling baths in which the principal constituent is an aqueous solution of a mineral acid to dissolve scale and other impurities from metal objects, have been improved heretofore by addition of agents to produce a film of foam on top of the pickling bath and reduce acid spraying. Such materials as cellulose pulp waste liquor, starch, flour, clays, commercial wetting agents and the like have been suggested for this purpose. Foaming agents heretofore suggested have, however, often required the frequent addition of substantial amounts of agent in order to maintain the desired film of foam under operating conditions, and even with large additions it has sometimes not been possible to maintain the foam film; moreover, prior agents have often shown an unduly long delay in forming the film of foam after addition of the agent.

I have now discovered a composition employable as a foaming agent in which all these disadvantages are surprisingly substantially eliminated or greatly reduced. The essential constituents of the composition of my invention include at least 40% of an alkali metal or alkaline earth metal lignin sulfonate, and a finely divided clay. Inert diluents in large or small amount, and small amounts of other materials such as wetting agents, may also be present in my composition.

Examples of clays suitable for use in the composition of my invention include bentonite, china clay, ball clay, fuller's earth, pyrophylite, and other finely divided clays. Bentonite is the preferred clay for the composition of my invention.

Examples of alkali metal and alkaline earth metal salts of lignin sulfonic acid suitable for use in the composition of my invention, include the sodium, potassium, calcium and magnesium salts. I prefer to employ either sodium lignin sulfonate or calcium lignin sulfonate, or mixtures of these. Sodium lignin sulfonate may be obtained, for example, by treatment of sulfite pulp waste liquor first with lime and then with $Na_2CO_3$. After filtering off the $CaCO_3$, the sodium salt may be separated by salting out, or the free lignin sulfonic acid may be separated by acidification and the sodium salt thereafter reformed. A similar process may be used to form the calcium salt, in this case the treatment with $Na_2CO_3$ and subsequent separation of $CaCO_3$ being omitted.

As above stated other ingredients may be included. In my copending application Serial No. 17,369, filed the same day as this application, entitled "Pickling Bath Agent," there is described a composition in which one or two percent of an alkanolated cationic wetting agent is added to reduce the delay in foam formation caused by the presence of glue in the pickling bath. Examples of other ingredients that may be present in small proportion, are carbonates and bicarbonates, for the purpose of providing initial gas evolution, and saponin-containing bark extracts for the purpose of improving foaming properties. My composition may also be admixed with a corrosion inhibitor if desired and the mixture of the two added to the pickling bath. In all such compositions containing additional ingredients the important characteristic that brings the composition within the scope of my invention is that bentonite or similar clay and a salt of lignin sulfonic acid, as above described, are both present as the important and usually the predominant foam-forming agents and the lignin sulfonate is present in an amount ranging from 2/3 to 3 times the amount of the clay.

When added to a metal pickling bath, for example a dilute aqueous solution of a strong mineral acid, e. g. a 10% aqueous solution of sulfuric acid, my foaming composition may be employed in concentrations as low as 0.005% by weight of the pickling bath. The preferred concentration is in the range 0.015% to 0.035%.

The following examples are illustrative of the product and process of my invention.

*Example 1.*—Two foaming compositions were prepared coming within the scope of my invention. The first contained about 50% sodium lignin sulfonate and about 50% Volclay bentonite. The second contained about 50% sodium lignin sulfonate, about 25% bentonite and about 25% of a crude chestnut wood extract.

A pickling bath was prepared by heating a 10% aqueous solution of sulfuric acid to 80° C. Pieces of high carbon steel were pickled in this bath.

Initially, 0.005% of my composition No. 1 was added to a pickling bath as above described containing high carbon steel, an additional .005% was added after one hour, an additional .005% after a total of 3½ hours, a further .005% after a total elapsed time of 6½ hours, and a final increment of .005% after an elapsed time of 10½ hours. A very good foam was maintained on the surface of the pickling bath at substantially all times during this process. My composition No. 2 was similarly added to a similar pickling bath except that it was necessary to add the third and fourth increments of .005% foaming agent a half hour earlier than in the case of the first composition and a fifth increment of .005% was added after 11½ hours. In this case a good foam was maintained for about half the period of the test and a fair foam for the remaining half of the test time.

Two commercial foaming agents outside the scope of my invention were tested for comparison. Commercial agent No. 1 was a sulfite pulp waste liquor while No. 2 was an aqueous solution of a commercial wetting agent of unknown type. The test conditions were the same as with my compositions. Initially, 0.005% of commercial agent No. 1 was added, after one hour another 0.005% was added, and additional 0.005% after a total of 3.5 hours, another 0.005% after 6.0 hours, another 0.005% after 9.5 hours, and a sixth increment of 0.005% after 11.5 hours. A total of 0.030% was added. During this period the foam was not as thick and not as effective in preventing spray as my compositions.

Initially, 0.005% commercial agent No. 2 was added. This did not provide a good foam. Frequent additions were made until the concentration reached 0.270%. At no time was a good foam formed.

Example 2.—Similar tests were carried out employing the same pickling bath at a temperature of 90° C. Approximately the same amounts of each of my foaming agents were employed in each case for most of the duration of the test. Under the same conditions, commercial agent No. 1 required 50% more foamer (0.03% as compared to 0.02%) to provide a foam and this was not as good as my foam. Commercial agent No. 2 did not provide a good foam even through the concentration reached 0.170%.

Example 3.—The test conditions of Example 2 were repeated employing each of the two types of foaming compositions described in Example 1 above, but in this case .025% of each foaming composition was added initially to the bath. No further amount of composition No. 1 was added for the duration of the test (six hours) but an additional .025% of composition No. 2 was added after 5½ hours. In each case a good foam was obtained for substantially the entire duration of the test. An additional 0.025% commercial agent No. 1 was required after 5.5 hours. The concentration of commercial agent No. 2 reached 0.30% without providing good foam. Neither commercial agent maintained as good a foam as the two compositions of my invention.

Example 4.—In a series of separate tests, foaming compositions within the scope of my invention were employed in pickling acids other than sulfuric acid. One of the foaming compositions used was my composition No. 1 of Example 1, namely 50% sodium lignin sulfonate and 50% bentonite. The other foamer (herein designated as my composition No. 3) consisted of 48% sodium lignin sulfonate, 50% bentonite and 2% of an ethanolated guanidine amine complex sold as "Aerosol C-61."

Each of these was employed in 10% aqueous HF at 60° C., 15% aqueous HCl at 60° C., and 10% aqueous $H_3PO_4$ at 80° C., the foaming agent being added in the amount of .025% by weight of bath. Pieces of high carbon steel were pickled in each bath.

In each case the foaming composition of my invention readily produced a good, stable foam.

Example 5.—A test of the two compositions described in Example 1 was carried out employing the same pickling bath as in Example 1 but employing low carbon steel in the bath instead of high carbon steel. The duration of this test was 32 hours and during that time a total of .03% of composition No. 1 had been added and .025% of composition No. 2. In each case a good foam was maintained for almost the entire duration of the test. A total of 0.030% commercial agent No. 1 and 0.160% commercial agent No. 2 was used. The foam of commercial agent No. 1 was not as good as my foam. The foam with commercial agent No. 2 was poor.

Example 6.—In a series of tests involving further ingredients, foaming agents as described below were added to pickling baths each consisting of 10% sulfuric acid solution held at 80° C. and containing pieces of high carbon steel. To each bath was added a .025% of a corrosion inhibitor consisting primarily of a urea-aldehyde condensation product. Each of the following compositions was added to one of such baths, as foaming agents, in such amount that about 0.0125% of the sodium lignin sulfonate was present in the bath:

(a) A mixture of 45% bentonite, 45% sodium lignin sulfonate and 10% Aerosol C-61 (an ethanolated guanadine amine complex).

(b) A mixture of 25% bentonite, 25% sodium lignin sulfonate, and 50% glycerine.

(c) A mixture of 25% bentonite, 25% sodium lignin sulfonate, and 50% lignone.

(d) A mixture of 25% bentonite, 25% sodium lignin sulfonate, and 50% black strap molasses.

(e) A mixture of 25% bentonite, 25% sodium lignin sulfonate, and 50% chestnut extract.

(f) A mixture of 48% sodium lignin sulfonate, 50% bentonite, and 2% Aerosol C-61.

In each case good foam was eventually obtained. (The foam appeared very promplty when the Aerosol C-61 was the additional ingredient.)

Example 7.—In tests carried out on the same type and condition of pickling bath described in Example 1, a composition containing about 99.18% $FeSO_4 \cdot 7H_2O$, about 0.41% sodium lignin sulfonate and about 0.41% bentonite was added to the bath, in amount equal to about 3% of the weight of the bath. Similarly a second composition containing about 99.18% $FeSO_4 \cdot 7H_2O$, about 0.40% sodium lignin sulfonate, about 0.21% bentonite and about 0.21% chestnut extract was added to a similar bath, in amount equal to about 3% of the bath. The first composition produced an excellent foam and the second a fair foam.

Example 8.—In additional tests, each of the following compositions was added to separate 10% sulfuric acid pickling baths containing high carbon steel and held at 80° C.

(a) 22½% of a urea-aldehyde condensation product, 9½% glue, 9½% sodium chloride, 7½% diphenylthiourea, 1% of an aryl alkyl polyether alcohol wetting agent, 25% sodium lignin sulfonate and 25% bentonite. 0.05% of this mixture was added to the pickling bath.

(b) 28.6% of a urea-thiourea-formaldehyde condensation product, 35.7% sodium lignin sulfonate and 35.7% bentonite. 0.035% of this mixture was added to the pickling bath.

(c) 28.6% glue, 35.7% sodium lignin sulfonate and 35.7% bentonite. 0.035% of this mixture was added to the pickling bath.

(d) About 11% di-o-tolyl thiourea, about 3% glue, about 36% sodium chloride, about 25% sodium lignin sulfonate and about 25% bentonite. 0.050% of this mixture was added to the bath. Each of (a), (b), (c) and (d) produced a good foam.

Example 9.—A direct comparison was made of the foaming properties of the following: (a) my foaming composition No. 1 (see Example 1); (b) untreated sulfite pulp waste; (c) evaporated sulfite pulp waste liquor; (d) partially purified sulfite pulp waste liquor (but still containing substantial amounts of organic constituents in addition to the lignin sulfonic acid or its salts); (e) bentonite alone; (f) Kingsley clay alone. Each of these was employed as foaming agent in a 10% $H_2SO_4$ pickling bath for high carbon steel.

The concentration of foamer required to give a good foam, and to maintain this foam under pickling conditions for five hours at 80° C. and one hour at 90 to 95° C., was as follows:

|  | Percent |
|---|---|
| My composition: ((a) above) | 0.010 |
| Compositions outside my invention: |  |
| (b) | 0.020 |
| (c) | 0.015 |
| (d) | 0.020 |
| (e) | No foam |
| (f) | No foam |

Example 10.—Tests were carried out as described in Examples 1 to 5, but substituting calcium lignin sulfonate for all of the sodium salt in one series, and for half of the sodium salt in another series. In each case results were essentially as good as with the sodium salt. Similarly the potassium or magnesium salt, or other alkali or alkaline earth lignin sulfonate, could be substituted for the sodium salt. Similar tests showed that other clays such as china clay, ball clay, fuller's earth or pyrophylite could be substituted for the bentonite.

Each of the above compositions produced a good foam on the pickling bath.

Since many modifications are possible in the process and product of my invention as above described without departing from the scope of the invention, it is intended that the above description of my invention should be interpreted as illustrative, and the invention is not to be limited except as set forth in the claims which follow.

I claim:

1. A composition for controlling the action of an acid bath for pickling metals comprising a foam-forming component containing as its essential ingredients a lignin sulfonate selected from the group consisting of alkali metal and alkaline earth metal lignin sulfonates and a finely divided clay, the lignin sulfonate being present in an amount at least two-thirds that of the clay, by weight.

2. A composition for controlling the action of an acid bath for pickling metals comprising a foam-forming component containing as its essential ingredients sodium lignin sulfonate and bentonite, the lignin sulfonate being present in an amount at least two-thirds that of the bentonite, by weight.

3. A composition for controlling the action of an acid bath for pickling metals comprising a foam-forming component containing as its essential ingredients calcium lignin sulfonate and bentonite, the lignin sulfonate being present in an amount at least two-thirds that of the bentonite, by weight.

4. A metal pickling bath comprising an aqueous solution of a non-oxidizing mineral acid and at least about .005% by weight of the bath of a foam-forming agent which contains as its essential ingredients a lignin sulfonate selected from the group consisting of alkali metal and alkaline earth metal lignin sulfonates and a finely divided clay, the amount of lignin sulfonate ranging from two-thirds to three times that of the clay, by weight.

5. A metal pickling bath comprising an aqueous solution of a non-oxidizing mineral acid and at least about .005% by weight of the bath of a foam-forming agent which contains as its essential ingredients a lignin sulfonate selected from the group consisting of alkali metal and alkaline earth metal lignin sulfonates and bentonite, the amount of lignin sulfonate ranging from two-thirds to three times that of the bentonite, by weight.

6. A metal pickling bath comprising an aqueous solution of a non-oxidizing mineral acid and at least about .005% by weight of the bath of a foam-forming agent which contains as its essential ingredients sodium lignin sulfonate and bentonite, the amount of lignin sulfonate ranging from two-thirds to three times that of the bentonite, by weight.

7. A metal pickling bath comprising an aqueous solution of a non-oxidizing mineral acid and at least about .005% by weight of the bath of a foam-forming agent which contains as its essential ingredients calcium lignin sulfonate and bentonite, the amount of lignin sulfonate ranging from two-thirds to three times that of the bentonite, by weight.

8. A metal pickling bath comprising an aqueous solution of a non-oxidizing mineral acid, at least about .002% by weight of the bath of a lignin sulfonate selected from the group consisting of alkali metal and alkaline earth metal lignin sulfonates and at least about .001% by weight of the bath of bentonite.

9. A method of reducing the spraying of an aqueous acid bath employed in the pickling of metals, comprising adding to the bath at least .002% by weight of the bath of a lignin sulfonate selected from the group consisting of alkali metal and alkaline earth metal lignin sulfonates and a finely divided clay, to form a film of foam on the bath, the amount of lignin sulfonate ranging from two-thirds to three times that of the clay, by weight.

JAMES W. CARROLL.

REFERENCES CITED

The following references are of record in the file of this patent:

UNITED STATES PATENTS

| Number | Name | Date |
|---|---|---|
| 1,852,648 | Gravell | Apr. 5, 1932 |
| 2,146,739 | Heath | Feb. 14, 1939 |

FOREIGN PATENTS

| Number | Country | Date |
|---|---|---|
| 619,040 | France | July 17, 1926 |